A. M. THREEWITS.
GRAIN DRILL.
APPLICATION FILED JUNE 28, 1919. RENEWED MAY 19, 1920.
1,345,517. Patented July 6, 1920.
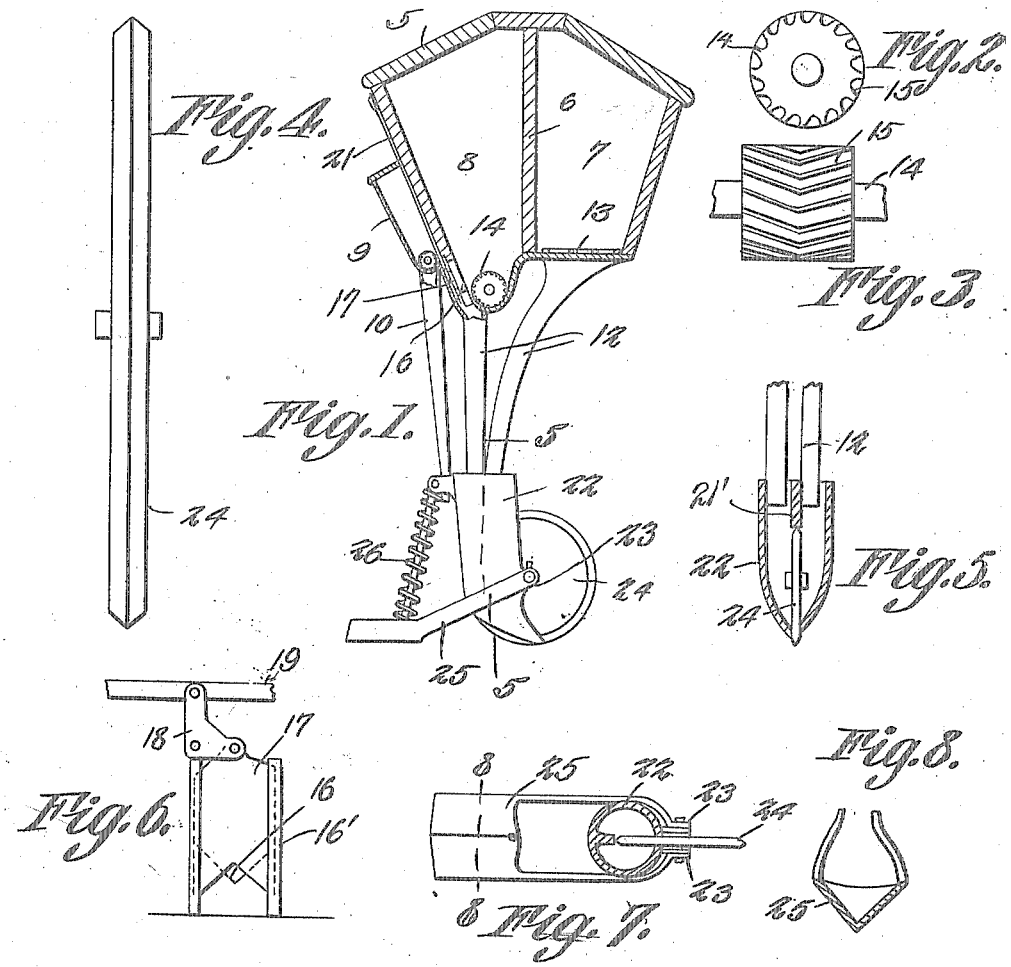
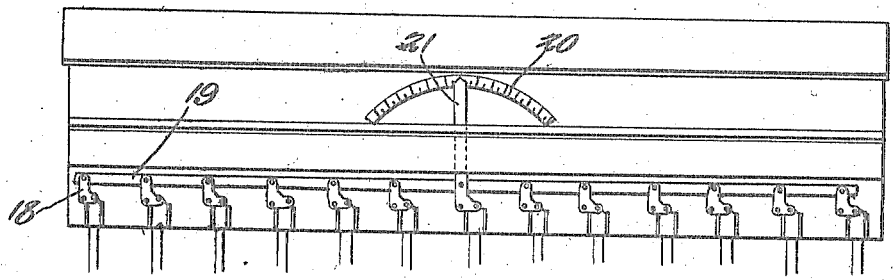
Witness
Inventor
A. M. Threewits
By
Attorneys

UNITED STATES PATENT OFFICE.

ALVIN M. THREEWITS, OF CENTERVILLE, INDIANA.

GRAIN-DRILL.

1,345,517.   Specification of Letters Patent.   Patented July 6, 1920.

Application filed June 28, 1919, Serial No. 307,275.  Renewed May 19, 1920. Serial No. 382,643.

*To all whom it may concern:*

Be it known that I, ALVIN M. THREEWITS, a citizen of the United States, residing at Centerville, in the county of Wayne and State of Indiana, have invented a new and useful Grain-Drill, of which the following is a specification.

The present invention relates to grain drills or planters, the main object being to provide a planter or drill which will drop seeds in rows and bury the same in the ground.

A further object is to provide a grain drill which embodies a plurality of hoppers for containing seeds of different kinds, and means for burying the seeds at various depths, it being necessary to plant some seeds deeper than others.

An additional object of the invention is to provide a grain drill having the above characteristics which is simple in construction, which consists of few parts, and which may be readily assembled and disassembled, and which can be manufactured and placed on the market at a minimum cost.

With the above and other objects and advantages in mind, the invention consists of the combinations of elements, constructions and arrangements, operations and general assemblage, the inventive features of which will be hereinafter specifically referred to and recited in the appended claims, one embodiment of the invention being illustrated in the accompanying drawing wherein:—

Figure 1 is a view partly in vertical cross section and partly in elevation of my improved grain drill;

Figs. 2, 3 and 4 are detail views of elements used in carrying out the invention.

Fig. 5 is a vertical sectional view taken on line 5—5 of Fig. 1;

Fig. 6 is a fragmentary view of one of the slide valves and operating mechanism therefor;

Fig. 7 is a horizontal transverse sectional view taken through the boot;

Fig. 8 is a transverse section through the shoe;

Fig. 9 is a top plan view of the drill.

Referring to the drawing by numerals of reference, the numeral 5 designates a hopper which is provided with a central wall 6 to afford the main chambers 7 and 8. Attached to the rear wall of the chamber 8 is a small seed chamber 9 from which extends a spout 10 that extends vertically. The hopper 5 is mounted upon wheels (not shown) to be drawn over the field in any desirable manner.

A vertical tube or spout 12 extends from the lower end of the seed chamber 8 while a similar spout extends from the fertilizer chamber 7, the fertilizer chamber having a slide valve 13 mounted therein while a rotary roller 14 is mounted in the bottom of the seed compartment and is provided with seed receiving grooves 15, which, when rotated, pick the seeds up and drop the same in the spout 12.

Openings 16 are provided in the bottom of the hopper 9 and guides 16' are disposed at the longitudinal edges of these openings in which are mounted the slide valves 17. Legs 18 are pivoted adjacent to these openings and are pivotally connected at one end with the valves 17 and an operating bar 19 at their opposite ends. A graduated scale 20 is provided over which the combined indicator and operating handle 21 moves to indicate to what degree the slide valves are open. The seed dropping tubes 12 depend from the hopper 9 and are arranged directly below the openings in the bottom of the same. Supported below the main hopper is a plurality of drill boots 22, one boot for each tube or spout 12 and 13. The side walls of these boots are pointed and curved toward each other, one being considerably shorter than the other. The fronts of these boots are slotted and spaced ears 23 are arranged adjacent these slots in which are mounted the rotatable furrowing disks 24 which are disposed centrally of the disks. Each boot is equipped with a central partition 21' in the upper end thereof and this partition is arranged vertically directly above the furrow disk whereby a seed tube 12 is disposed upon one side of the partition and the fertilizer tube upon the other side, thus preventing the seeds and fertilizer from mixing in the boots; the seeds being discharged by way of the longer curved wall of the boot and below the surface of the ground while the fertilizer is dropped above the same from the shorter wall of the boot.

Pivoted to each of the boots 22 is a furrow covering shoe 25 which drags over the furrows and is held in contact with the ground through the medium of the expansible spring 26.

From the disclosure it will be apparent that as the drill is moved over the field the seeds will be dropped in rows or furrows made by the disks 24 and covered by shoes 25. It will also be seen that by moving the member 21 the valve slides will be opened and register the degree of the opening on the graduated scale 20.

This disclosure is merely illustrative and it is to be understood that the same may be changed and modified in many ways and that my limits of such modification are governed only by what is claimed.

What is claimed is:—

1. A seed drill, a hopper, discharge tubes depending therefrom, a drill boot receiving the ends of the tubes, a partition in said boot and disposed between said discharge tubes, and a disk rotatably mounted in said boot directly below said partition, the disk being projected through the boot for dividing the same into two independent passage ways.

2. In a seed drill, a hopper, discharge tubes depending from the bottom of the hopper, a drill boot receiving the ends of the tubes, the side walls of the drill boot being longitudinally curved and one wall projecting below the other, a furrow forming disk rotatable in the side walls of the boot and dividing the same, and a trailing shoe for covering the furrows mounted rearwardly of the boot.

3. In a grain drill, a hopper having a pair of compartments, a tube depending from each of the compartments a drill boot receiving the ends of the tubes and being provided with a slot in its front wall, the side walls of said boot being curved toward each other, one wall projecting below the other, a furrow forming disk mounted in the drill and movable through the slot, the periphery of the disk being flush with the end of the longer wall whereby the seed being discharged along the longer wall will be deposited at the bottom of the furrow, the shorter wall causing the fertilizer to be deposited upon the top of the furrow and means carried by the boot for covering the furrow.

In testimony that I claim the foregoing as my own, I have hereto affixed my signature in the presence of witnesses.

ALVIN M. THREEWITS.

Witnesses:
GEORGE KRAMER,
PAUL A. BECKETT,
WALTER J. BURGESS.